United States Patent
DeCusatis et al.

(10) Patent No.: US 8,152,304 B2
(45) Date of Patent: *Apr. 10, 2012

(54) STEREOGRAPHIC IMAGING SYSTEM USING OPEN LOOP MAGNETOMECHANICALLY RESONANT POLARIZING FILTER ACTUATOR

(75) Inventors: Casimer M. DeCusatis, Poughkeepsie, NY (US); Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

This patent is subject to a terminal disclaimer.

(21) Appl. No.: 11/468,364

(22) Filed: Aug. 30, 2006

(65) Prior Publication Data

US 2008/0055401 A1    Mar. 6, 2008

(51) Int. Cl.
G03B 21/00 (2006.01)
H04N 13/04 (2006.01)

(52) U.S. Cl. ............................ 353/8; 348/57
(58) Field of Classification Search .................. 353/6–9; 359/462–467; 348/42–60
See application file for complete search history.

(56) References Cited

U.S. PATENT DOCUMENTS

| | | | |
|---|---|---|---|
| 1,879,793 A | 9/1932 | Chubb | |
| 2,571,612 A | 10/1951 | Rines | |
| 4,486,095 A | 12/1984 | Mitchelson | |
| 5,365,283 A | 11/1994 | Doherty et al. | |
| 5,608,211 A | 3/1997 | Hirono et al. | |
| 5,967,636 A | 10/1999 | Stark et al. | |
| 5,983,004 A | 11/1999 | Shaw et al. | |
| 6,069,733 A * | 5/2000 | Spink et al. | 359/388 |
| 6,108,053 A | 8/2000 | Pettitt et al. | |
| 6,147,674 A | 11/2000 | Rosenberg et al. | |
| 6,449,309 B1 | 9/2002 | Tabata | |
| 6,535,241 B1 | 3/2003 | McDowall et al. | |
| 6,549,650 B1 | 4/2003 | Ishikawa et al. | |
| 6,609,977 B1 | 8/2003 | Shimizu et al. | |
| 6,676,259 B1 | 1/2004 | Trifilo | |
| 6,924,833 B1 | 8/2005 | McDowall et al. | |
| 6,932,476 B2 * | 8/2005 | Sudo et al. | 353/7 |
| RE39,342 E | 10/2006 | Starks et al. | |
| 7,635,189 B2 | 12/2009 | DeCusatis et al. | |
| 2001/0015753 A1 | 8/2001 | Myers | |
| 2002/0118276 A1 | 8/2002 | Seong | |

(Continued)

FOREIGN PATENT DOCUMENTS

JP    10-153755    9/1998

(Continued)

OTHER PUBLICATIONS

The I2C-Bus Specification, Version 2.1, Jan. 2000, Doc. No. 939839340011, Phillips Corporation, pp. 1-45.

(Continued)

*Primary Examiner* — Thanh X Luu
(74) *Attorney, Agent, or Firm* — Steven Chiu

(57) ABSTRACT

An apparatus and method for stereoscopic 3D image projection and viewing using a single projection source, alternating polarization, and passive eyewear. This approach is applicable to frame sequential video created using existing 3D graphics APIs, as well as other video signal formats, and is compatible with existing digital light processor (DLP) technology for both front and rear projection systems. An alternating polarizer in the form of a magnetomechanically resonant polarizing filter actuator is used to modulate the projected image. A preferred embodiment enables an existing DLP projection system to be enhanced with 3D capability.

16 Claims, 10 Drawing Sheets

U.S. PATENT DOCUMENTS

| | | | |
|---|---|---|---|
| 2002/0140910 A1 | 10/2002 | Stark et al. | |
| 2002/0149941 A1 | 10/2002 | Mateescu et al. | |
| 2002/0196332 A1 | 12/2002 | Lipton et al. | |
| 2003/0112507 A1 | 6/2003 | Divelbiss et al. | |
| 2003/0214631 A1 | 11/2003 | Svardal et al. | |
| 2004/0041747 A1 | 3/2004 | Uehara et al. | |
| 2004/0095767 A1 | 5/2004 | Ohmae et al. | |
| 2004/0100484 A1 | 5/2004 | Barrett | |
| 2005/0041163 A1 | 2/2005 | Butler-Smith et al. | |
| 2005/0046700 A1 | 3/2005 | Bracke | |
| 2005/0179823 A1 | 8/2005 | Kim | |
| 2005/0179824 A1 | 8/2005 | Ahn | |
| 2005/0212980 A1 | 9/2005 | Miyazaki | |
| 2005/0225630 A1 | 10/2005 | Childers et al. | |
| 2005/0237487 A1* | 10/2005 | Chang | 353/7 |
| 2006/0100021 A1 | 5/2006 | Yoshino et al. | |
| 2006/0114362 A1 | 6/2006 | Kim et al. | |
| 2006/0256287 A1* | 11/2006 | Jacobs | 352/85 |
| 2007/0139519 A1 | 6/2007 | DeCusatis et al. | |
| 2007/0139616 A1 | 6/2007 | DeCusatis et al. | |
| 2007/0139617 A1 | 6/2007 | DeCusatis et al. | |
| 2007/0139618 A1 | 6/2007 | DeCusatis et al. | |
| 2007/0139619 A1 | 6/2007 | DeCusatis et al. | |
| 2007/0139769 A1 | 6/2007 | DeCusatis et al. | |
| 2008/0055401 A1 | 3/2008 | Decusatis et al. | |
| 2008/0055402 A1 | 3/2008 | Decusatis et al. | |
| 2008/0055546 A1 | 3/2008 | DeCusatis et al. | |
| 2009/0190095 A1 | 7/2009 | Ellinger et al. | |
| 2010/0231695 A1 | 9/2010 | Decusatis et al. | |

FOREIGN PATENT DOCUMENTS

| | | |
|---|---|---|
| WO | WO 2005/112440 | 11/2005 |

OTHER PUBLICATIONS

Office Action dated Dec. 9, 2008, U.S. Appl. No. 11/314,327, filed Dec. 21, 2005.
Office Action dated Jun. 4, 2010, U.S. Appl. No. 11/314,419, filed Dec. 21, 2005.
Office Action dated Jul. 29, 2010, U.S. Appl. No. 11/314,260, filed Dec. 21, 2005.
Office Action dated Apr. 29, 2009, U.S. Appl. No. 11/314,389, filed Dec. 21, 2005.
Office Action dated Dec. 9, 2008, U.S. Appl. No. 11/314,388, filed Dec. 21, 2005.
Office Action dated Jul. 13, 2009, U.S. Appl. No. 11/314,327, filed Dec. 21, 2005.
USPTO U.S. Appl. No. 11/314,383 to DeCusatis et al. filed Dec. 21, 2005, Office Action dated Sep. 13, 2010.
USPTO U.S. Appl. No. 11/468,370 to DeCusatis et al., filed Aug. 30, 2006, Notice of Allowance dated Sep. 23, 2010.
USPTO U.S. Appl. No. 11/314,419 to DeCusatis et al., filed Dec. 21, 2005, Notice of Allowance dated Sep. 15, 2010.
USPTO U.S. Appl. No. 11/314,379 to DeCusatis et al filed Dec. 21, 2005, Office Action dated Sep. 30, 2010.
USPTO U.S. Appl. No. 11/468,370 to DeCusatis et al., filed Aug. 30, 2006, Office Action Dated Mar. 4, 2011.
USPTO U.S. Appl. No. 11/468,369 to DeCusatis et al., filed Aug. 30, 2006, Office Action Mar. 17, 2011.
USPTO U.S. Appl. No. 11/468,369, filed Aug. 30, 2006 to Decusatis et al., Final Office Action dated Jul. 20, 201.
USPTO U.S. Appl. No. 11/468,369, filed Aug. 30, 2006 to Decusatis et al., Office Action dated Nov. 2, 2011.

* cited by examiner

STEREOGRAPHIC IMAGING SYSTEM USING OPEN LOOP MAGNETOMECHANICALLY RESONANT POLARIZING FILTER ACTUATOR

CROSS REFERENCES TO RELATED APPLICATIONS

U.S. patent application Ser. No. 11/314,379, filed Dec. 21, 2005, entitled "STEREOGRAPHIC PROJECTION APPARATUS WITH PASSIVE EYEWEAR UTILIZING A CONTINUOUSLY VARIABLE POLARIZING ELEMENT"; Ser. No. 11/468,369, filed concurrently herewith, entitled "CLOSED LOOP FEEDBACK CONTROL TO MAXIMIZE STEREO SEPARATION IN 3D IMAGING SYSTEMS"; and Ser. No. 11/468,370, filed concurrently herewith, entitled "DYNAMIC PROJECTOR REFRESH RATE ADJUSTMENT VIA PWM CONTROL" are assigned to the same assignee hereof and contain subject matter related, in certain respect, to the subject matter of the present application. The above-identified patent applications are incorporated herein by reference in their entirety.

BACKGROUND OF THE INVENTION

1. Technical Field of the Invention

The present invention provides a three dimensional ("3D") image projection apparatus that can be combined with a single light source projection system, and enables a viewer to perceive a three dimensional projected image while using passive eyewear. A polarization scheme, compatible with both front and rear projection digital light processor based projection systems, as well as frame sequenced projection systems, is described herein.

2. Description of the Prior Art

FIG. 1 shows a prior art 3D imaging system that illustrates several fundamental requirements for 3D image projection. Two two-dimensional ("2D") images of one scene are displayed, such as by projection apparatuses 101, one of which is slightly different than the second in terms of a line of sight perspective. These perspectives typically define a left eye view and a right eye view. This normally requires dual image recordation in order to provide the two perspectives, or views, as described above, of the same scene. However, such perspectives could be digitally processed, or manually generated. FIG. 1 illustrates two projectors 101 one of which projects a left eye perspective of a scene while the other simultaneously projects a right eye perspective of the same scene. Although simultaneous projection requires two projectors, it is possible to implement a single projector in a 3D imaging system by rapidly alternating the left and right eye perspectives during projection.

Another theoretical requirement of conventional 3D imaging systems is to expose one of the projected perspectives to substantially only one of either the left or right eye and to expose the other of the projected perspectives to substantially only the other eye, such that each projected perspective is seen substantially exclusively only by one eye. The term "substantially" is meant to convey that the image exclusivity be sufficient to induce a 3D perception in the viewer. Thus, with a dual simultaneous projection system, one eye of a viewer will be substantially blocked from seeing the image content from one of the projectors and the other eye will be substantially blocked from seeing the image content from the other projector.

This blocking, often referred to as extinction, can be accomplished in two steps. First, each of the simultaneously projected images is polarized at a different polarizing angle by projection through separately angled polarized transparent media 102. The viewer wears passive polarized eyewear 103 whose lenses are also offset polarized such that one of the lenses will block a first one of the polarized projected images and the other lens will block the second one of the polarized projected images. The physics of polarization, particularly overlapping transparent polarized media, is sufficiently known by those skilled in the art and is not described in detail herein. Prior art methods of providing two different projected perspectival images to a viewer include coloring the projected images using red and blue color coding combined with passive eyewear having a blue and a red lens that is worn by the viewer.

There have been many attempts to generate 3D image systems. We are concerned here with 3D imaging in systems which use polarization encoding of the left and right eye views, which may be implemented using a switched system. Modern front and rear projection color imaging systems, such as DLP technology, employ multiple color filters to sequentially project elements of a full color image onto a screen. These color filters are typically implemented as segments on a color filter wheel, which spins at a rate synchronized with the input video stream. Typically, this approach uses the three basic video imaging colors (red, blue, and green) in combination with a high brightness white light source. In order to facilitate white balance of the image and correct for certain kinds of image aberrations, a transparent filter segment is often incorporated into the color filter wheel, allowing white light to pass through.

In order to modify these imaging systems so that they support the transmission of stereoscopic three-dimensional images, it is necessary for them to provide separate left and right eye views. The separate eye views can be provided by separate image streams that are combined into a single stream of digital image data and by alternating the projection of image data between these image streams to provide the left and right eye views to the viewer and using an additional filtering apparatus, which may or may not be part of the same color filter wheel used in the projector. In this case, it may become necessary to synchronize the phase, frequency, and possibly other attributes of the rotating color filter wheel with an external stereoscopic imaging element. This synchronization is not necessarily always achieved simply by accessing the electronic signals used to control the color filter wheel.

Published patent application US 2005/0041163A1 describes the use of a segmented polarizer attached to the color filter wheel inside a digital light processor ("DLP") projector. It does not describe any required relationship between the projector lens optics and an alternating polarizer with respect to polarization sensitivity. Thus, the projection lenses and other optics may corrupt the polarization encoded image signal. Details of the synchronization required between the filter wheel and polarization wheel are not described, nor is there any reference to the distinction between frame sequential and other types of video input. This prior art will not work for all types of video input such as line interleaved video streams. The above-identified patent application is incorporated herein by reference in its entirety.

U.S. Pat. No. 5,993,004 describes a stereoscopic display with a spatial light modulator and polarization modulator, using polarization preserving optics and special control signals for the modulation. As a general statement, this approach does not use alternating polarization as our invention does. The above-identified patent is incorporated herein by reference in its entirety.

Published U.S. patent application 2005/0046700A1 describes two video processing devices which process at least four separate sequences of video images for projecting multiple image views on a screen simultaneously. At a high level, this approach does not use alternating polarization as our invention does. The above-identified patent application is incorporated herein by reference in its entirety.

Published U.S. Application 2003/0112507 describes two embodiments for DMD devices, both of which use different rows or columns of the DMD device driven sequentially to provide different eye views of the same image. This approach is not related to the use of alternating polarization as our invention is. The above-identified patent application is incorporated herein by reference in its entirety.

Published U.S. application 2003/0214631 describes a projector with a beam splitter to produce two light paths, each of which passes through a fixed polarizer and are later recombined with a special optical system. This approach does not use alternating polarization as our invention does. The above-identified patent application is incorporated herein by reference in its entirety.

U.S. Pat. No. 1,879,793 describes the original motion picture projection system (similar to those later used in IMAX 3D applications) in which the rate of film passing through the projector is synchronized in some fashion with an external polarizing wheel or slides. This approach requires special film processing techniques. The above-identified patent is incorporated herein by reference in its entirety.

In the personal computer ("PC") industry, liquid crystal display ("LCD") optical shutter glasses have become the standard for cathode ray tube ("CRT") and projector viewing for color 3D imagery. However, this requires active eyewear (with a miniature liquid crystal monitor or shutter in each lens), as well as requiring a battery and connection to the data source for synchronization purposes. These solutions also tend to be expensive, are only practical for a limited number of users at one time, and tend to induce eye strain after prolonged use. These glasses typically use the Display Data Channel industry standard contained in every modern video adaptor card interface. This data channel signals the glasses that the PC has swapped its eye view.

In general, the prior art requires the projector to use internal optics which are polarization insensitive, since the light polarization must be maintained from the filter wheel through the rest of the projection path. This means that special optics must be used, and polarization sensitive coatings must be avoided, thereby increasing both the complexity and implementation cost.

SUMMARY OF THE INVENTION

One embodiment of the present invention includes an enhancement to a 3D imaging system and uses light polarization to encode images for the left and right eye views. The polarization encoding is generated by a magneto-mechanical voice coil actuator. A television system including this invention comprises an input for receiving image data that includes a plurality of image streams and a light projector for projecting the image streams. The magnetomechanical oscillating filter includes an oscillating arm with attached polarization filters for polarizing the projected image streams at different polarizing angles.

A method of the present invention includes receiving image data comprising a plurality of image streams and projecting the image data while alternating between the image streams. A magnetomechanically oscillating polarizer filters frames projected from the image streams depending on which of either a left or right eye view is being projected.

In order to get maximum separation between the left and right eye images, and thus the best depth of field for 3D images, the system should ideally hold the polarizer at a fixed orientation relative to the light beam while each frame is projected. Ideally, one would use the smallest piece of polarizing film possible and place it at the smallest image beam size within the system, to achieve uniform polarization of the entire image.

In order to address these issues, we have developed a new design for a 3D projection system, as shown in FIGS. 3A-C. We use a magnetic bearing system to move a pair of small pieces of polarized film through the projector's internal focal point. Since the image is sufficiently small at this point, we achieve uniform polarization of the entire image. Further, we need to move the film by only a small amount to switch between polarization states. A working prototype moves the polarizing filters film up or down by approximately one inch through an angle of about 30 degrees.

A multiplexed sensor array, illustrated in FIGS. 8A-C, can be implemented for optimal extinction of the polarizer device. Because these are analog sensors, it can be incorporated into a linear feedback control system to achieve optimal performance and power efficiency. Most polarizing material available today has a nicely flat passband in the wavelength range of 400 nm-700 nm with approximately 60-70% transparency. One embodiment of the present system uses visible light sources to achieve linear feedback signals. We use an LED device with an output wavelength of 660 nm because the output spectrum of the UHP/SHP/P-VIP/Xenon arc lamp typically used in projectors is very deficient in the red range (roughly 600 nm and above). In this way, along with adequate mechanical shielding, interference from the images from the projector itself will not be able to cause signal interference.

It is an object of the invention to provide a method and apparatus for generating stereoscopic three-dimensional images on front or rear projection imaging systems, such as digital light processor (DLP) or similar apparatus. These solutions require a signal from the video source to synchronize the imaging system projector. Typically, this signal is derived from the standard video signal interface on a personal computer ("PC"). The present invention does not require that the 3D recordation be done with any specific equipment or number of cameras, only that two perspectives be obtainable or derivable from image data and are capable of being projected for display.

It is an object of the present invention to provide three dimensional imaging at low implementation cost, compatible with many different kinds of video input or image data sources. Further, this invention provides the means for multiple viewers to perceive the image at the same time, from a range of viewing angles. The present invention is compatible with legacy projection devices.

A method of the present invention includes receiving image data that comprises a number of image streams, typically transmitted digitally and sequentially and each containing images having defined boundaries. These are usually referred to as data frames. A digital projection apparatus and system using a light source is capable of receiving this image data and projecting the represented images toward a screen for viewing by any number of observers who sit on either side of the screen depending on whether the system is a front or rear projection system. The image can be still, motion picture, or computer generated, color or black and white. For generating a 3D effect, modern projection systems typically alternate projection of images that contain left and right eye views.

This usually, though not necessarily, means that individual frames are alternately transmitted which contain alternate left and right eye views. Switching between left and right eye view projection need not alternate with each frame, though the left-right images should switch at a rate fast enough to not be detectable by a viewer. Thus, the image stream may swap frames faster than swapping left/right eye views.

The individual left and right eye projected images are polarized at different, complementary polarization angles before the projected images reach the screen using a unique magnetomechanically actuated alternating filter that is synchronized with the transmitted image data. Passive polarizing eyeglasses are worn by a viewer, wherein the left and right eye lenses are polarized relative to the alternating filter polarization such that selected ones of the polarized projected images will be blocked from view due to polarization extinguishing. This induces an experience in the viewer of watching three dimensional still images, 3D motion picture images, or computer generated images, still or in motion.

An apparatus for performing the method described above includes a projection television system or other imaging apparatus that sequentially projects images using a light source. An input receives the image data which includes synchronization signals to indicate whether a left or right eye view data is being received. This received image data is projected using a light source projector. A voice coil actuator motor driven alternating filter positioned in the path of the projected stereographic image data separately polarizes the projected stereographic image data according to whether left or right eye data is being received and is synchronized by detecting the synchronization signals.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications. The figures below are not drawn to any accurate scale with respect to size, shape, angular relationship, spatial relationship, or relative positions.

BEST MODE FOR CARRYING OUT THE INVENTION

The present invention provides 3D viewing using passive eyewear, thus reducing cost and avoiding eye strain and color perception issues associated with various alternatives. It can be used with a single projection source based on popular DLP technology (or related technologies including GLV), and may be realized as either an integral part of a projection system or as an add-on peripheral or stand that can be placed in front of a projector. This invention takes advantage of the prior art 3D interface support provided in popular software packages, such as the OpenGL™ or Direct3D™ application programming interface ("API"), which includes variants such as java3D™. This interface is compatible with the vast majority of 3D image software and programs in use today. All of these APIs generate digital content with left/right eye perspectives, for use with alternative technologies such as the active shutter glasses described previously. This content can be used without modifications by our proposed invention. Synchronization is provided by the device driver and left/right content is provided automatically in these APIs. A user need only select OpenGL™ or Direct3D™ to render in stereo and it places the image streams in memory concurrently. The device driver then transmits the image data to a target device (two projectors, one projector with page flipping, one projector with line interleaved stereo, for example). Other types of digital content may need to be preprocessed to generate left/right eye views compatible with 3D imaging techniques. For some types of content such as digital movies or electronic images this processing is fairly straightforward (other types of content, such as broadcast television, require additional, more complex processing to enable 3D viewing).

Figure 2:
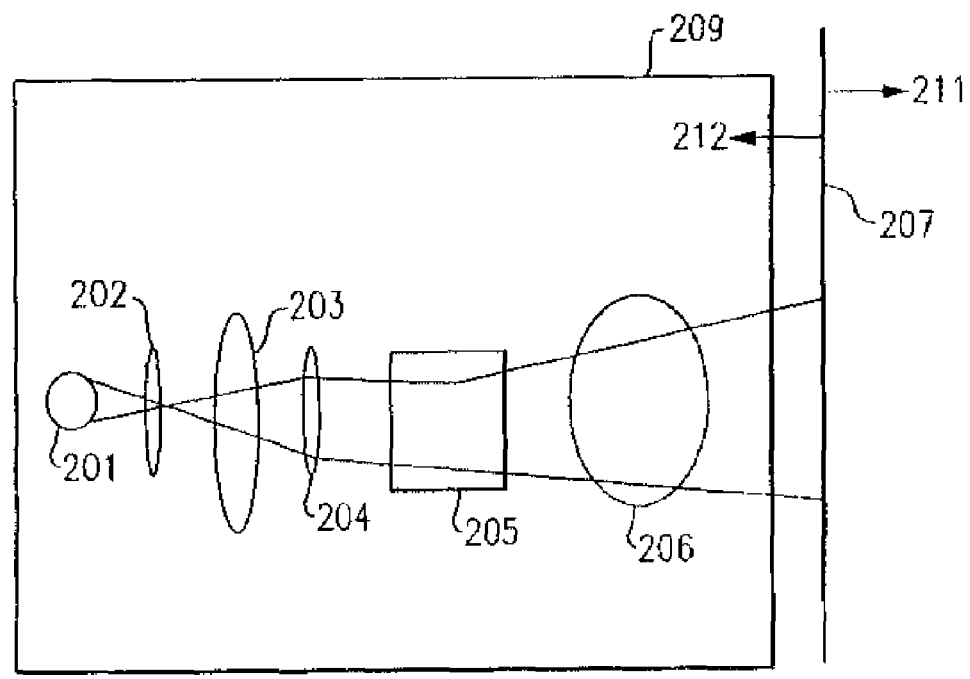
FIG. 2 illustrates a basic prior art DLP projection system.

Referring to FIG. 2, illustrated are the basic principles of an example DLP system 209. A white light source 201 is focused through a condensing lens 202 which then passes through a rotating color filter wheel 203. The filter wheel may contain the three principle colors used to create video and graphics images (red, green, and blue), or different colors. The present invention is not limited to using only a rotating color filter wheel. Other technologies may exist or may be developed which provide a directed light beam containing a projected image (such as digital frame sequential images, stereographic or not) that can be implemented with the present invention. The proposed invention is generally applicable to any light source projection system, typically a single light source that does not rely on polarization to create the image itself. Restated another way, the polarization of the light output of the imaging device used should be randomized. The presently proposed invention uses polarization techniques to produce 3D effects, therefore, projections systems that rely on polarization techniques themselves might interfere with polarization implementations in the present invention.

As shown in FIG. 2, the beam passes through the color filter wheel 203, through a focusing lens 204, and illuminates a DMD 205 which is driven by firmware from a video source, such as from a personal computer, DVD, a stored format, or a television signal, among others. Other possible video sources include grating light valve and phase change display technology.

The image content processed by the DMD is synchronized with the rotating color filter wheel such that the red content of the desired image illuminates the DMD when the red filter segment is aligned with the DMD while the focused light passes through it. The green image content illuminates the DMD when the green filter is aligned with the DMD, and so on. Thus, for each image frame that is projected by such a DLP system, the color filter wheel and DMD operate together to sequentially project several color planes for each image frame. The sequential parts of an image are then focused through additional projection optics 206 onto a screen 207 to create a suitable 2D image, which may be a still image or motion picture. Images projected by a front projection system would be viewed from the same side 212 of the screen 207 as the projection equipment. A rear projected image would be viewed from the side 211 opposite the projector equipment.

Figure 1:
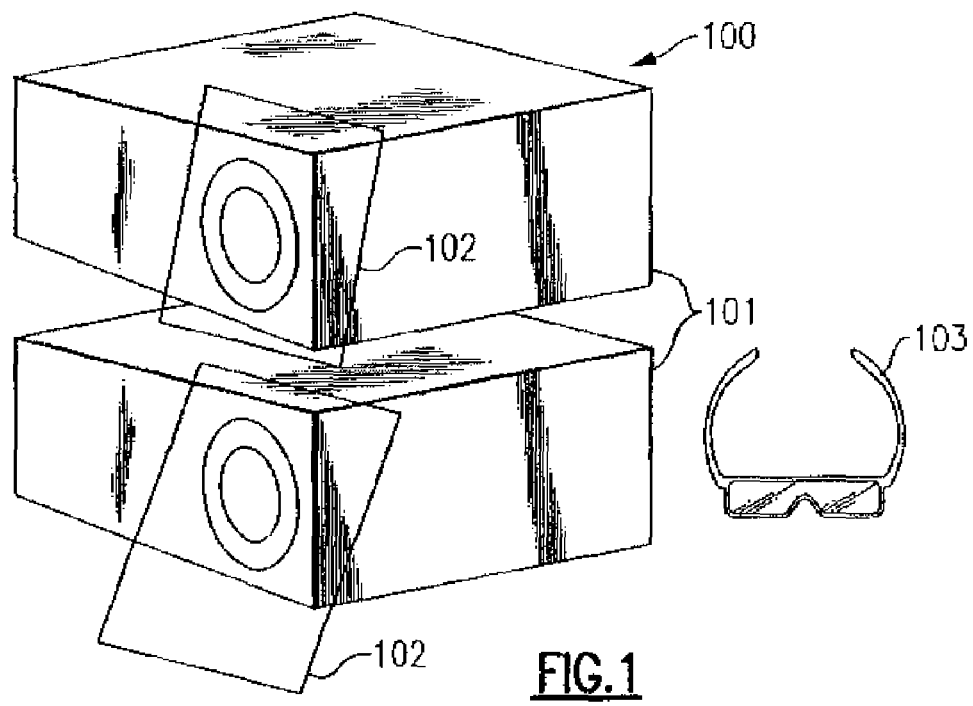
FIG. 1 illustrates a prior art dual projection system for 3D imaging.

If the three color content is processed by the system shown in FIG. 2 at a sufficiently high frame rate, measured in frames per second, it will cause an observer to perceive a full color stable 2D image on the screen. There are many variations of this technology, including systems which use 2 or 3 DMD devices to create the final image, and systems which employ both rear projection and front projection techniques. Details of the optical elements used in the beam path, such as the condensing lenses and projection lenses, may also vary, and are not essential parts of the present invention. The dual projector apparatus shown in FIG. 1, for example, could be composed of two DLP projectors. Due to its performance and low cost, DLP is becoming a preferred technology for many large screen projection televisions, portable personal computer projectors, and similar applications.

Figure 3A:
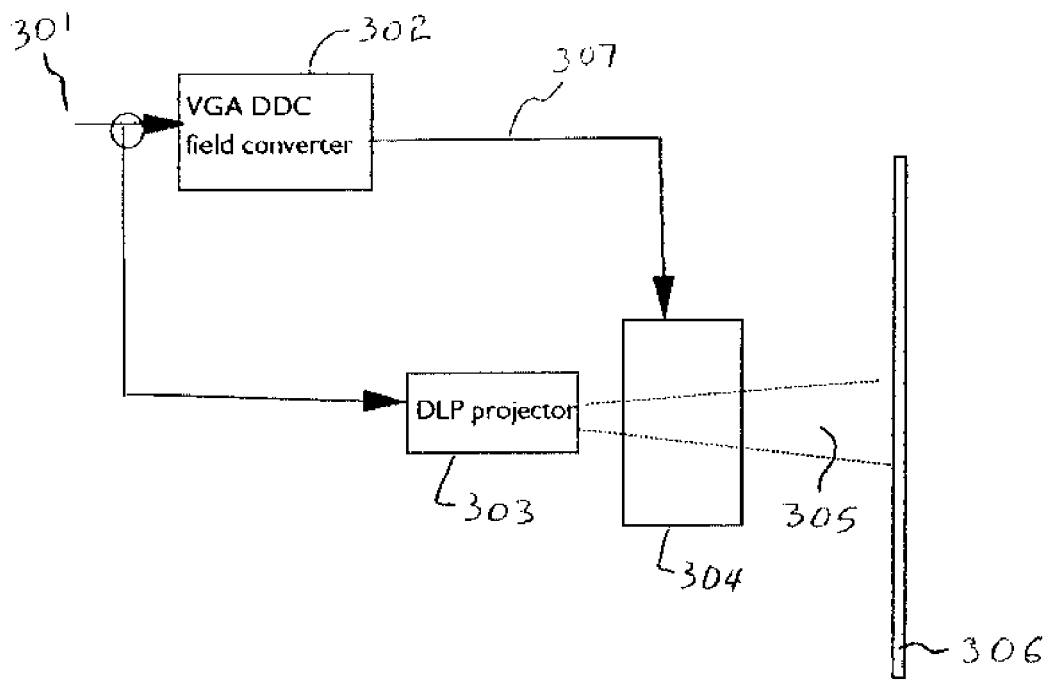
FIG. 3A illustrates an embodiment of the present invention implemented with the example DLP system of FIG. 2.

FIG. 3A illustrates a preferred embodiment of the present invention including a magnetomechanically oscillating polarizing filter 304 which is mounted in front of an existing DLP projector 303, which may be implemented as a front or rear projection system depending on which side of the viewable screen 306 a viewer sits. Variants of the present invention allow for use with rear projection systems and for integrating this invention internally to the projector. In a time division multiplexed ("TDM") video stream, for example, a PC transmits page flipped stereo images, compatible with industry conventions such as the APIs discussed previously. Page flipping refers to the sequentially transmitted alternating left and right eye views, or frames, whose transmission speeds, or refresh rate, may vary from several to hundreds of Hertz. The left and right eye views are also often separately referred to herein as image streams, as parts of the transmitted image data, even though they operate together to generate a 3D effect.

Note that there may not be any additional optics in the light path beyond the polarizer unless they preserve the polarization state of the light. This is an important consideration if the magnetomechanically actuated polarizer is to be integrated within the projector. The resulting image must also be projected on a screen 306 or other surface which preserves polarization of the reflected light, or retracted light as in rear projection systems. Such screens are commercially available, for example by ScreenTech™, of Hamburg, Germany, and Da-lite™ of Warsaw, Ind., USA. We also note that our invention may apply to other types of image projection technology besides DMD/DLP; for example, the recently proposed grating light valve ("GLV") technology. GLV is an alternative to DLP and other light engine projection technologies, in which a combination of diffraction grating and liquid crystal technology is used to generate 2D images suitable for either rear or front projection systems.

With the present invention, passive polarizing eyewear can be used to view the full color 3D image(s). The proposed invention is intended to be used with the industry standard linearly polarized 3D glasses having an orthogonal polarization orientation (with 0° centered between left and right eye): left eye −45° with respect to 0°, and right eye +45° with respect to 0°. Obviously, these angle orientations are not a requirement of the present invention but are selected merely for industry compatibility. The present invention can be easily adjusted for implementation using other angular relationships. It will be apparent to those skilled in the art that minor adjustments to the invention will allow the use of passive eyewear with lenses having different polarization orientations as well as circular or elliptical polarization states. Circular and elliptical polarized passive eyewear is commercially available.

It is well known that given a sufficiently fast video refresh rate, the human eye's persistence of vision will cause it to perceive a true color 3D image, given an appropriately presented series of 2D images. In this way, an existing DLP projector can be upgraded to project 3D images, by implementing an external device to be placed at the output aperture of the projector, thereby requiring no modification to the original projector hardware or firmware. Note that frame sequential video signals must be used in order to achieve this effect with the present invention. Frame sequential video signals describe a time division multiplexed signal of alternating left-eye designated and right-eye designated images. This means that individually transmitted images each representing a left or right eye view are sequentially received and handled by the projection system. Although it may be ideal to alternate a left and a right eye view with each projected frame, as is the intent of the design of many digital stereographic systems, other designs may also produce a substantial 3D effect by taking advantage of the human eye's persistence of vision. For example, some other sequential number of frames may be transmitted for a right or left eye view prior to alternating frames for the opposite eye view.

Video Input Signal

The incoming stereo signal (e.g. 301 of FIG. 3A) typically is one that is purposely produced for 3D stereo imaging, e.g. computer software video shot with dual lens cameras. However, the incoming image data can come from a source such as a video game, PC, or digital television data. A stereo VGA signal and added information, such as DDC, HDMI, High Def, Multi Media Interface, and Y—Pr—Pb from digital cable boxes and DVD players, are also suitable. A minimum requirement for the present invention is an input containing stereo video data, which means that dual left/right images can be obtained, derived, or processed from the video data. Video data can also be transmitted via packets, frames, or cells wherein header information can be used to indicate left or right eye content in the payload. In such an implementation, a 3D movie can be transmitted over the internet, and stored indefinitely, or projected for viewing as it is received, such as in real time video streaming. Some industry standard signals, such as HDMI, would need to implement a preliminary circuit for extracting the sync signal (page flip signal) from the incoming video data. Thus, an HDMI input stream would work with the present invention using a page flipping extractor whose output is provided to the polarizer apparatus. HDMI input is typically provided with page flip information on the input data. For the presently described embodiments, we assume that the incoming video signal is an industry standard stereo VGA signal, those these standards may evolve and change over time. The scope of the present invention contemplates improvements in video imaging technology and its data content.

Embedded in the VGA standard is a "DDC" capability which is a low bandwidth digital message interface implemented typically with a bidirectional serial bus, to send page flip signals in parallel with the left/right images indicating which of either a left or right image is currently being transmitted.

Industry standard protocols such as stereo VGA provide fixed known rates for the incoming frames, e.g. 60 Hz, 85 Hz, 100 Hz, or 120 Hz, where the stereo rate is half of that, thereby transmitting half as many of each of the left and right eye frames/images per second. Many computer programs also provide digital stereo image sources such as video games, architectural graphics programs, CAD programs, and medical imaging programs, as examples, which contain stereo VGA signals.

With respect to FIG. 3A, an incoming stereo video signal (e.g. TDM frame sequential) 301 is received by the conventional DLP projector 303 which then decodes and projects the video image. In parallel with the DLP projector, the present inventive method and system receives the incoming stereo video signal and extracts, via field converter 302, the stereo synchronization signal 307, i.e. the page flip signal, embedded therein and provides it to the magnetomechanical polarization filter 304. The stereo synchronization signal indicates which of the two stereo images is present in the video stream at any instant of time. In the present invention, each of the two stereo image streams will be modulated as a left eye designated or right eye designated. The extraction circuit 302 is a well known VGA field converter circuit implementing the well know DDC page flip protocol. eDimensional™, Inc. of West Palm Beach, Fla., provides circuits for connecting to a stereo VGA signal which then outputs the page flip signal together with the video stream. The well known DDC algorithm can also be manually implemented by executing it on any of a variety of processors.

Figure 3B:
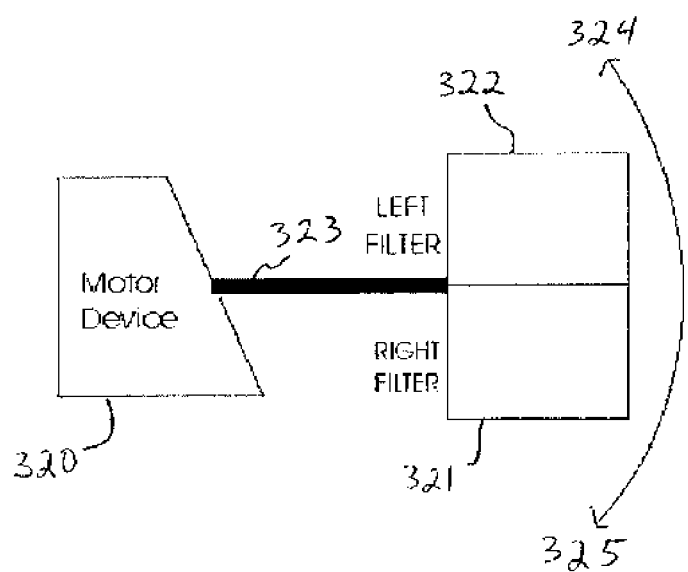
FIG. 3B illustrates an embodiment of a magnetomechanical oscillator.

FIG. 3B illustrates, at a high level, the magnetomechanically actuated polarization apparatus 304. A motor 320 oscillates an attached rigid lever arm 323, between positions 324 and 325, which has attached thereto left 322 and right 321 polarized filters.

Figure 3C:
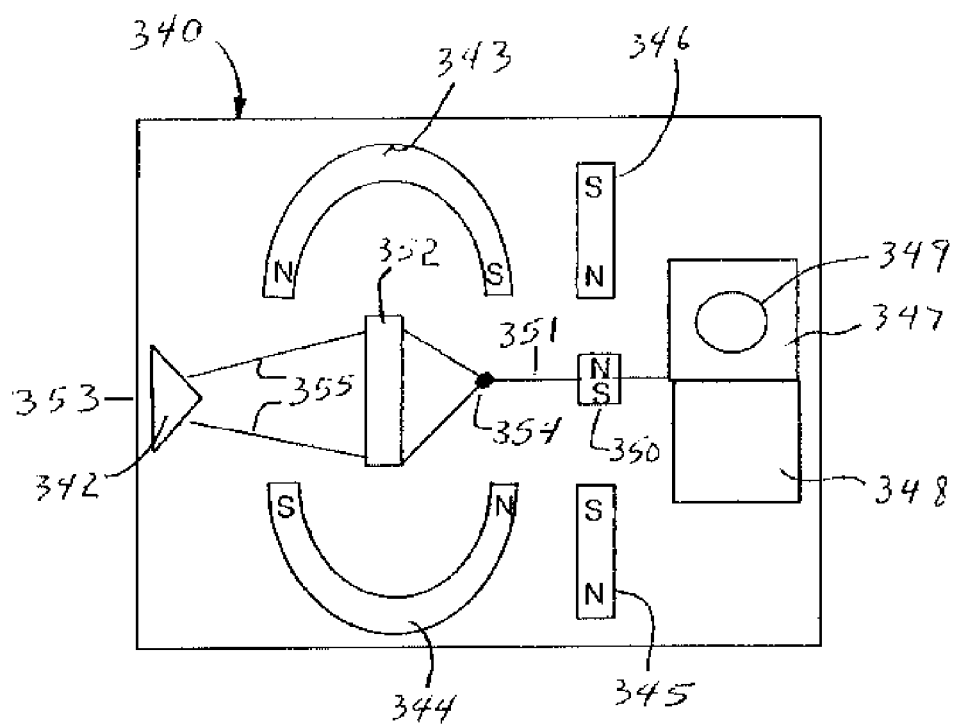
FIG. 3C illustrates an embodiment of the present invention.

With regard to FIG. 3C, showing in greater detail the apparatus 304, the page flip signal arrives at input 353 activating an AC control and amplifier drive circuit 342 having two complimentary outputs 355, forming an AC current source which is coupled to and actuates a magnetic coil 352 within a larger fixed magnetic field generated by a pair of parallel permanent magnetic plates 343 and 344. The alternating current in coil 352 causes an alternating magnetic orientation in the coil causing it to move a lever arm 351 up and down on each current cycle. We attach the rigid lever arm to two small pieces of polarizing film 347 and 348, and to pivot 354, with appropriate polarizing orientation on the top and bottom film sections. In this way, the film is moved through the projector focal plane 349 (not shown precisely to scale or position) to encode left and right eye images with predetermined angles of polarization. Because the coil 352 is disposed in a static magnetic field generated by permanent magnets 343 and 344, the alternating current in the coil will drive its movement up and down, thereby causing the polarizing filter arm 351, with attached pair of polarizing filters 347 and 348 to similarly oscillate up and down around the pivot 354. The permanent magnet magnetic bearings 345 and 346 are prefabricated to have a magnetic flux strength resonant at the desired operating frequency, for example 60 cycles/second for a standard video stream. This prefabrication is a result of trial and error measurement of the energy consumption of the actuator system using ammeters while adjusting magnetic field strength of solenoids which are used in place of the magnets 345 and 346, as further explained below. The effects of gravity need to be taken into account in selecting and/or tuning the field strength of these magnets as the downward motion of the polarizer arm will be positively accelerated due to gravity and the upward motion will be negatively accelerated to due to gravity.

These cushioning magnets 345 and 346 are optionally replaced, in an alternative embodiment, with air core solenoids (illustrated in FIG. 9) that provide scalable duty cycle magnetic flux strength tuning. By adjusting the current through the air core solenoid cushioning magnets while monitoring the coil current, an ideal cushion magnet flux can be determined because the motor coil current will reach a minimum amperage. Comparable magnetic flux strength permanent magnets then can be used to replace the solenoids. Mechanical stops are provided at the top and bottom of the level arm's travel distance (not shown). As the coil driven oscillation of the filter arm 351 approaches stationary magnets 345 and 346, attached magnet 350 dampens the movement of the filter arm by decelerating its movement, preventing actual contact between the magnets, due to the increasing repulsive force exerted by the N-N pole and S-S pole proximity. The bottom permanent magnet 345 can be fabricated with greater magnetic field strength so that the effects of gravity can be compensated and the oscillating system is more symmetric with respect to magnetic field effects. This results in a true magnetomechanically resonant system. Controlled annealing of the magnets can be used to selectively adjust their field strength, as measured in oersteds. The procedures for controlled annealing of magnets is beyond the scope of the present invention and is not further discussed. The interaction of these fields also serve to steady the arm 351 when it is resting in an "off" state.

Achieving a 60 Hz magnetomechanical resonance results in a system that requires very little energy to drive. Without such resonance, it may require in the range of approximately 50-100 watts to maintain 60 Hz response, while a magnetomechanically resonant system requires approximately 4 watts to drive at a steady state. This resonance can be achieved by replacing the permanent magnet cushions with temporary air core solenoids coupled to a variable current source. The known specs of the solenoids, such as dimensions and number of windings, etc., current, can be used to determine the strength of generated magnetic flux. Vendor provided permanent magnets having a magnetic flux equivalent to the temporary solenoids can then be obtained and used in place of the solenoids.

There are a number of additional features associated with this invention. For example, we note that if the projector is oriented horizontally, then the lever arm will have a negative bias due to gravity at the lower half of its travel distance. We have measured the arm's impulse response to confirm this and have compensated for this by adjusting the strength of the lower magnetic bearing 345 (this is also accomplished by controlled annealing of the magnet as is mentioned above). This could also be addressed by mounting the bearings sideways, though this may not be compatible with space constraints in existing projectors. Also, we note that since the polarizer is moving at an angle, there will be some crosstalk when a linear polarizer, 347 or 348, is not centered on the image 349. This can be addressed by using circular polarizers, which are not sensitive to orientation but are somewhat more expensive. Alternatively, we have been able to use linear polarizer segments cut at a small bias angle of approximately three degrees to reduce ghosting in the image. Thus far, we have mostly described an open loop system with a moving coil that allows us to move the polarizer filter with low energy expended.

Field Converter

Figure 3D:
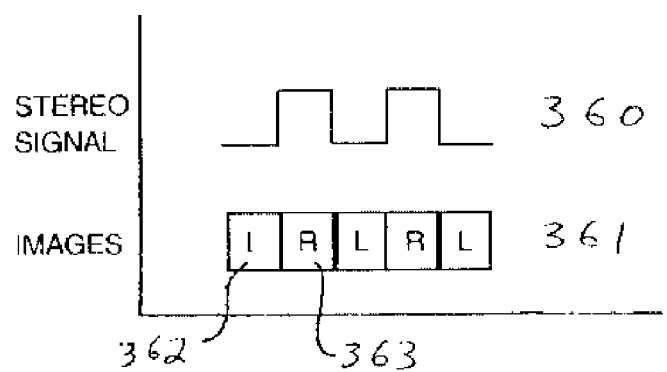
FIG. 3D illustrates a stereo signal synchronized with left and right eye image data.

With reference to FIG. 3A, the input signal is received by a field converter 302 that extracts the page flip signal, or a video synchronization ("vsync") signal, as described above, which indicates which of left or right eye data, or image stream, is present in the image data. The video data continues to be provided to the DLP projector 303 while the page flip data 307 is used by the circuitry 304 of the present invention. The output signal (stereo signal) 307 of the field converter is illustrated in FIG. 3D 360 and alternates between an indication for left eye view "L" and an indication for a right eye view "R" 361, which is simply a high, logical 1, and low, logical 0, voltage signal. The square wave 360 indicates, for example, that the logical "1" (or higher voltage level) corresponds to right eye data in the video stream. A logical "0" (lower voltage level) indicates a corresponding left eye image being transmitted in the image data. In an ideal embodiment, the left and right eye image data alternates with each individual frame, but is not required in to produce an effective 3D appearance.

A preferred embodiment of the present invention implements positive edge triggering, or edge sensitive triggering, to detect the required signals. An alternate embodiment could use level sensitive triggering, in which the signal is switched based on its amplitude crossing a preselected threshold. Level sensitivity implies variability in duration, since the signal amplitude levels can drift or move because of effects such as noise and ground shifts. Thus, there must be a defined tolerance around the specified shift levels to account for these factors in a practical design.

Figure 4:
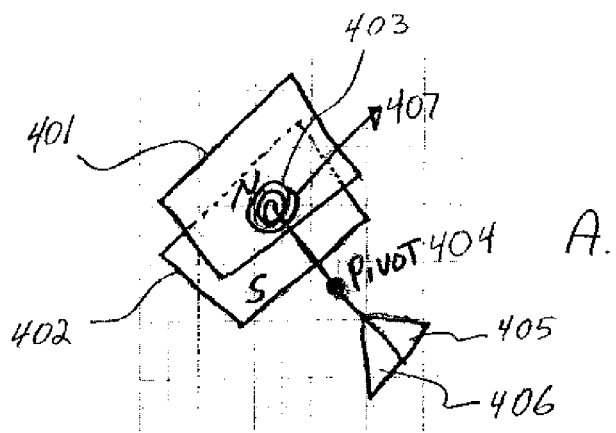
FIGS. 4A-B illustrate physical considerations for sizing the polarizing filter mechanism.

FIGS. 4A-C, illustrate characteristics of the servo device design, i.e. the motor element 320 in FIG. 3B. With respect to FIG. 4A, a set of applicable equations for the servo device system will help to determine the amount of torque 407 that the motor will generate. In this figure, the motor is represented by a pair of permanent magnet plates 401 and 402 that provide a static magnetic field between them. A coil 403 is suspended in the static magnetic field between the magnet plates and is coupled to a pivot 404. As is well known in the art, the magnitude of torque is equal to $2F/D \sin(\theta) = IBA \sin(\theta)$, in which D is the length of the lever arm, F is the linear force, and $\sin(\theta)=1$ in this instance because the coil is oriented orthogonally in the magnetic field; A is the number of turns·radius (avg area of the coil); I is the current through the coil wire; and B is the flux linkage of the magnet poles N and S.

With respect to FIG. 4B, illustrated is an ideal balanced polarizer arm compensated for gravity using the motor torque drive provided by coil 440 in a static magnetic field, as described above, and cushioning of the polarizer arm provided by cushioning magnets 442 and 443. In the illustration shown, there is an upward force $F_1$ 447 on the polarizer arm and a downward force $F_2$ 448 aided by gravity, $\frac{1}{2} AT^2$, (A=distance, T=time) which must be added or subtracted from the applied torque force, F·radius, wherein F (force) is equal to (the polarizer mass)·gravity. The polarizer mass is the mass of the polarizer films 445 and 446. The polarizer arm, attached to sections of polarizing film 445 and 446, is fixed by a pivot 441. The cushioning magnets used 442 and 443 are N35 Iron Boron (NdFeB) with residual flux of 12,000 gauss. These cushion the arm magnet 444, which is typically an off the shelf magnet whose field strength is not adjusted via annealing or other techniques. In the equations illustrated in FIG. 4B, A=area of effective magnet faces; L=thickness of magnets; X=distance between magnets; R=radius of magnets assuming they are discs. $\mu_0$ is the relative permeability of air. $B_0$=flux at magnet face in teslas; $B_r$ (residual flux)=12,000 gauss; $B_h$max=35 mega gauss oersteds (a merit value of magnetic material related to field strength).

The resulting dimensions of a working prototype, which can be scaled to sizes appropriate for various projector profiles, are as follows: each of the polarizer films are approximately one inch square; the polarizer arm, from pivot to outside edge of polarizing film is approximately 2¼ inches; the cushioning magnet dimensions are approximately ¼ in. dia. ¹⁄₁₆ in. thick discs; the coil is approximately a ¾×1 in. torus; and the field magnets are ¼w×2 in.

Open and Closed Loop Embodiments

Figure 5:
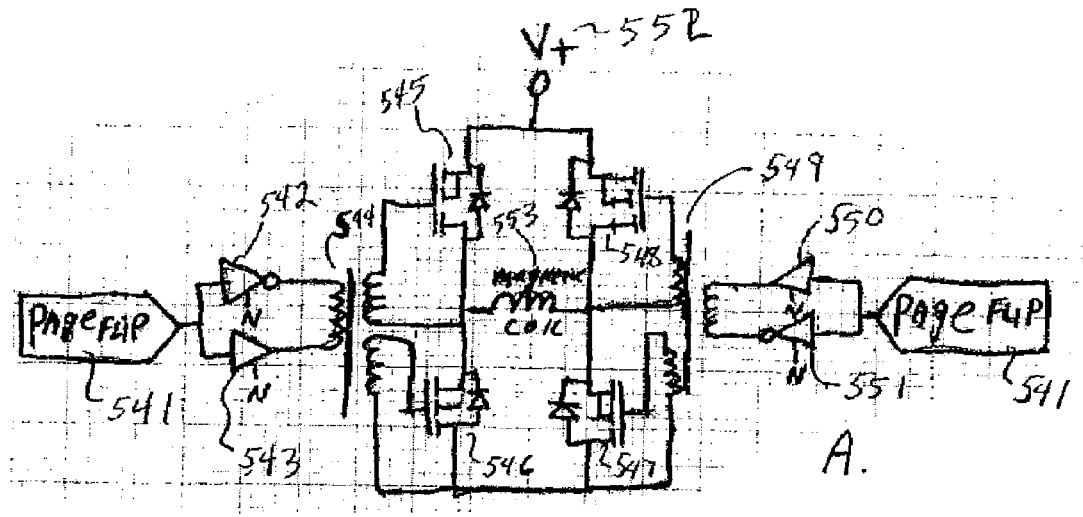
FIGS. 5A-D illustrate circuitry for the open loop and closed loop embodiments and electrical waveforms for an embodiment of the present invention.
Figure 5:
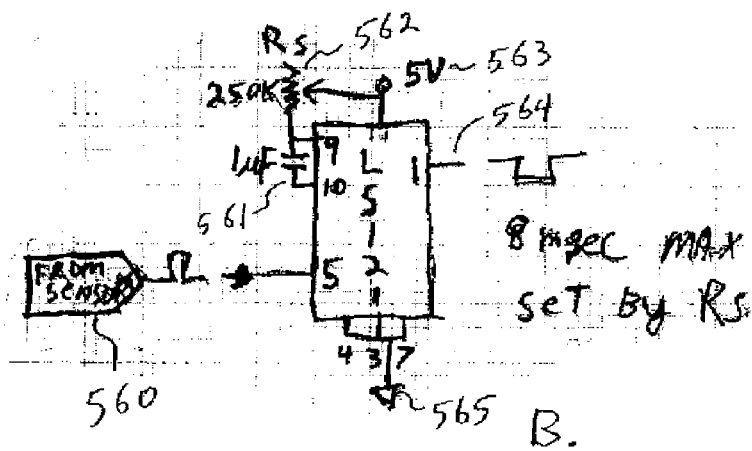
Figure 5:
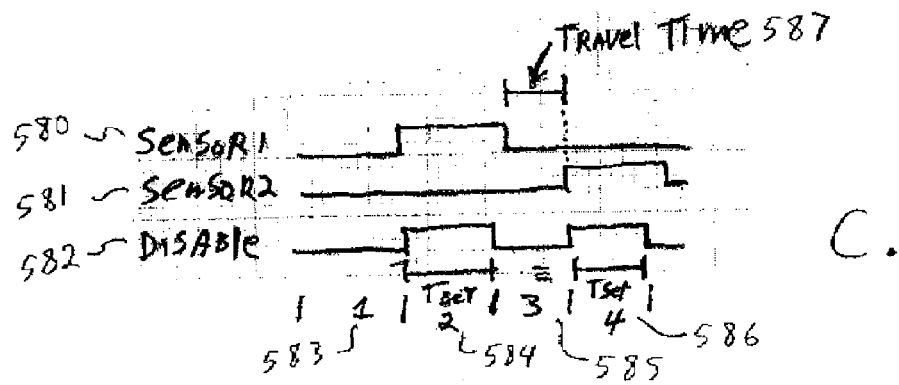
Figure 5:
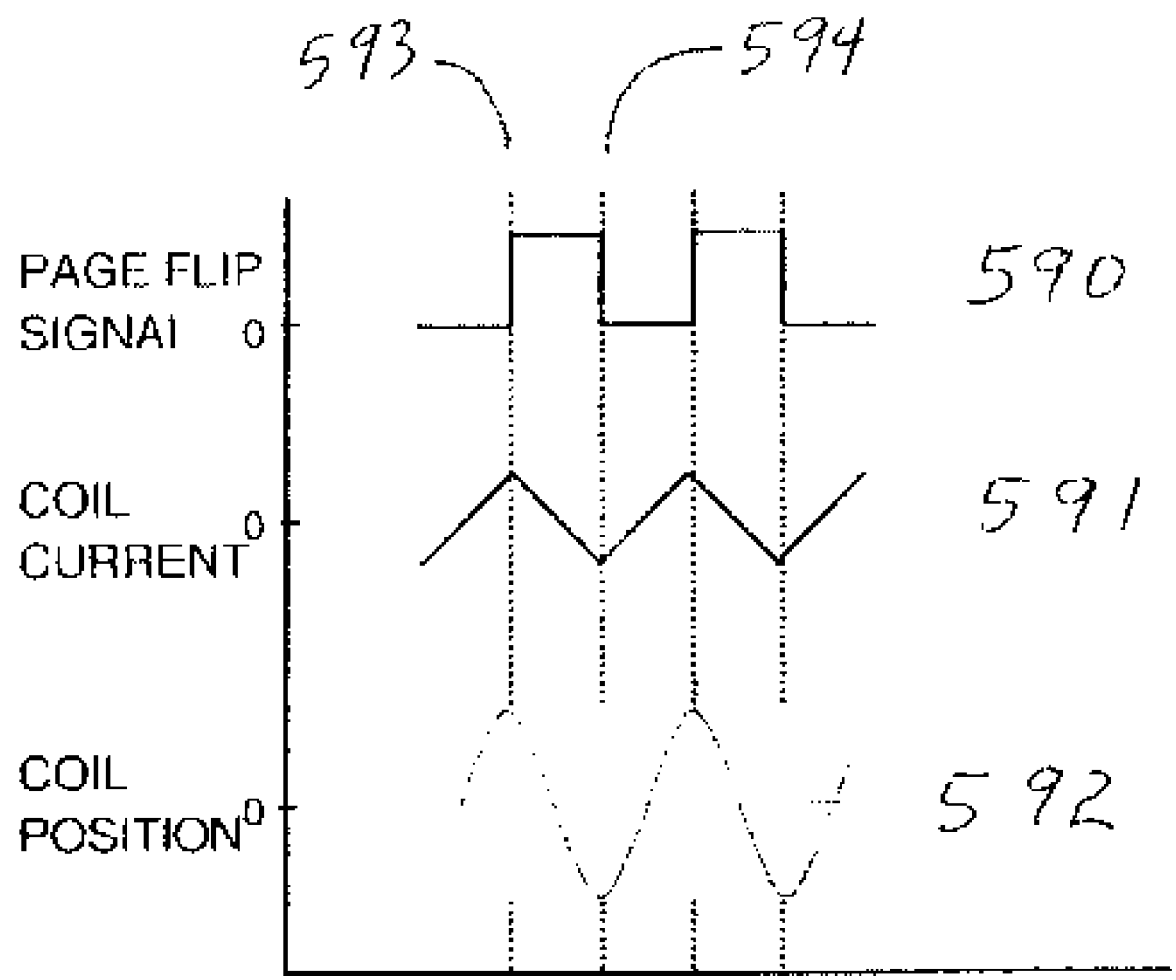

FIG. 5A illustrates a MOSFET power inverter circuitry (element 342 in FIG. 3C) that drives the servo motor device in one embodiment of the present invention. The devices used in this circuit are n channel power MOSFETs appropriately sized for the motor device. The fundamental frequency of the open loop circuit depends upon the video synchronization signal (page flip) rate. When this page flip signal is at a high level ("1") the power MOSFETs 545 and 547 are gated on and current flows through the coil 553 in a direction from the upper left MOSFET 545 to the lower right MOSFET 547. A logic low ("0") page flip signal then gates off the power MOSFETs 545 and 547 and activates the other two MOSFETS 546 and 548. Because the transformer windings are coupled out of phase, current flows from the upper right MOSFET 548 down through the coil, in an opposite direction, to MOSFET 546. This alternating current flow through the coil drives the oscillation of the polarizer arm as explained above. As illustrated in FIG. 5D, the page flip signal (an excitation voltage for this circuit) is a square wave 590, the coil current increase and decrease is linear 591, and the motion of the polarizer arm is sinusoidal 592.

Figure 6A:
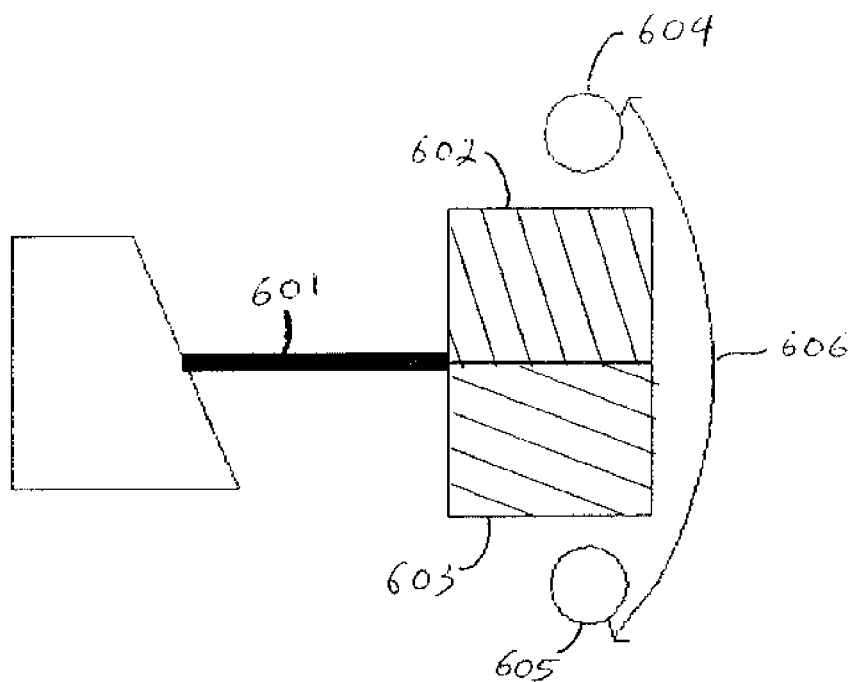
FIGS. 6A-C illustrate the polarized filter and its movement.
Figure 6B:
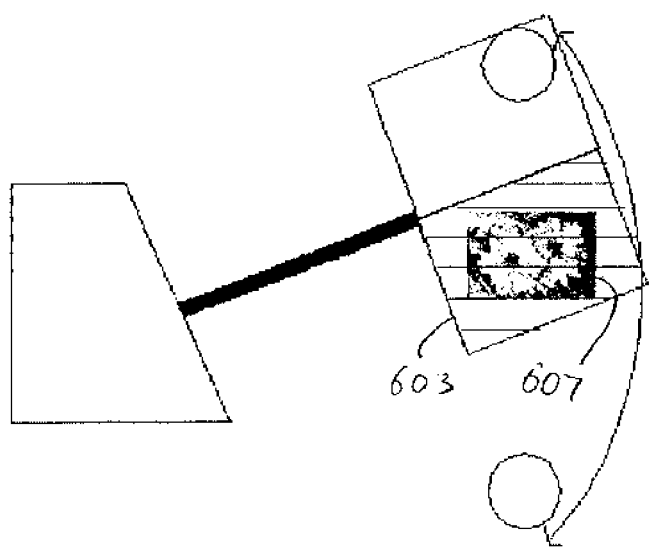
Figure 6C:
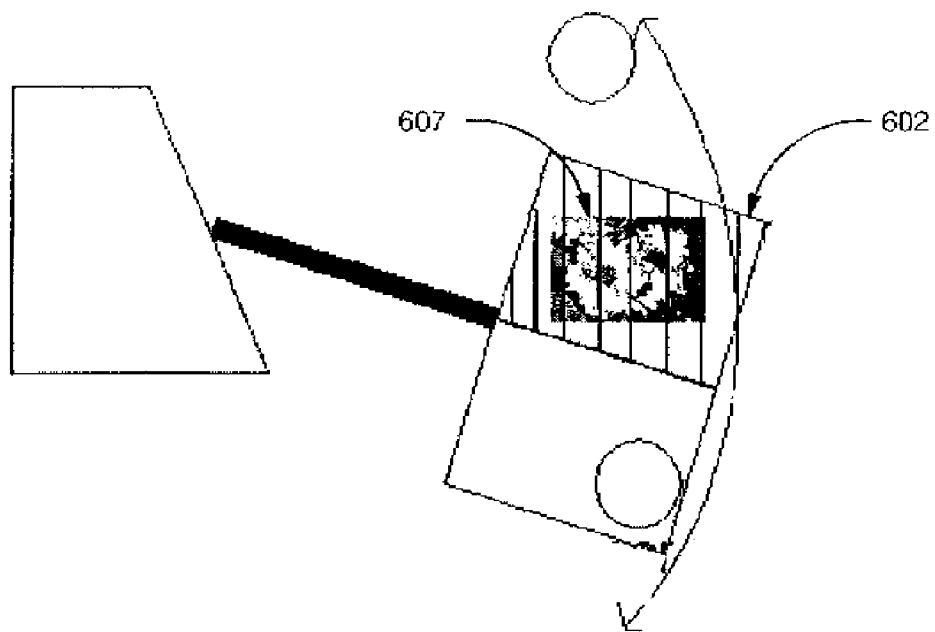

FIG. 6A illustrates the approximate polarization angles of the filters 602 and 603 as they are mounted on the lever arm 601 and the LED optical sensors 604, 605 for detecting the lever arm in position for polarization filtering of the image, shown in FIGS. 6B and 6C. The addition of the optical sensors adds a feedback element to the open loop embodiment described herein.

The filters are polarized at an angle such that when each filter is in final position in the image beam 607, the effective relative polarization of the image is orthogonal as between the left and right filters, as illustrated in FIGS. 6B and 6C. Obviously, these polarization angles can be reversed so that, for example, the left polarizing filter 602 is in a horizontal relationship with the projected image. When the lever arm 601 is fully in the "up" position, the projected image 607, which is projected from the image stream that contains right eye frames, passes through the right filter 603 as shown in FIG. 6B. When the lever arm is fully in the "down" position, the projected image 607 which is projected from the image stream that contains left eye frames, passes through the left filter 602 as shown in FIG. 6C. This illustrates the oscillating motion of the filters and selective projection and filtering of frames containing left and right eye image data.

Referring again to FIGS. 5A-C, to implement one embodiment of the present invention wherein sensors are used detect a position of the polarizing filters, the drive current to the coil 553 is shut off when the polarizing filter achieves one of its filtering positions, thereby blocking its corresponding LED and triggering the corresponding sensor, and remains off until the next transition of the page flip signal input which is transmitted to two inputs 541. There are two stages of commutation, as described below. With reference to the description of the circuitry shown in FIGS. 5A-C and in FIGS. 8A-C, it is well known to those skilled in the art that electronic signal activation and transmission can be of either positive or negative polarity depending on arbitrary circuit design and selection of devices, such as npn or pnp type transistors. Hence, the polarities of the illustrated waveforms and their descriptions herein are not critical to the correct operation of the present invention. Thus, the polarities of signal waveforms and corresponding description may be reversed as between separate figures herein. It is understood by those skilled in the art that a signal which indicates the occurrence of an event may arbitrarily be selected as a positive or negative going signal and can be appropriately designed and interpreted in any particular implementation.

Referring to FIG. 5C, during interval 1 583 switches 545 and 547 are on, and the actuator is accelerating in a first direction until a sensor is interrupted. The interrupted sensor transmits at 560 a signal 580 to the one shot timer, illustrated in FIG. 5B as LSI 21, at input pin 5. The one shot timer output, illustrated in FIG. 5C, is activated 582 for a fixed amount of time, illustrated as interval 2, disabling the gate drive signal to the MOSFETs by outputting at pin 1 564 the fixed time pulse which is transmitted to four inputs N at devices 542, 543, 550, and 551. These devices are MOSFET gate drive integrated circuits having logic level input and high current output with inverting and non-inverting varieties. Example part Nos. include Texas Instruments UCC27321 and UCC 27322 Integrated Circuits, which are used in this embodiment. This off time of the gate drive signal is illustrated as interval 2 584. At this point the actuator is traveling due to its momentum. With regard to interval 3 585, the page flip signal changes polarity causing switches 546 and 548 to turn on, while 545 and 547 turn off. While idealized drive transformers are shown, it should be appreciated by one skilled in the art that a number of gate drive topologies can be employed, such as floating power supplies with optical isolation for control, charge pumps, or custom H-bridge drive devices such as the IR2127S, from International Rectifier of El Segundo, Calif.

With reference to the waveforms illustrated in FIG. 5C, interval 1 583 is the time window when the arm is traveling. Interval 2 (Tset) 584 is the fixed time window when the drive current is off—the fixed off time. Interval 3 585 is the "travel time" when the polarizer arm is in motion moving toward its opposite position until it triggers a sensor. Then there is another fixed off time, interval 4 586, while waiting for the disable signal to turn off.

In the closed loop embodiment, a sensor will detect a polarizing filter causing it to feed a pulse 560 to the LSI (LS 121, a one shot timer) chip. There will be two pulses provided per cycle, one during pull and one during push. They can be combined via a logical OR circuit to provide a signal to the LSI. The disable signal corresponds to the output 564 of the LSI. The output pulse 564 is a fixed width pulse proportional to the RC circuit comprising a capacitor 561 and a resistor 562 attached to it as shown, using a 250 KΩ resistor and a 1 μF capacitor with a 5V power supply 563. These are devices preselected appropriately for the overall system characteristics. The output of the LSI 564 is fed to the four enable signal inputs (N) on the driver chips 542, 543, 550, and 551. When the disable signal is high the driver chips are driving current to the MOSFETs through pulse transformers 549 and 544, when the LSI output 564 goes low it pulls both drivers to the off state. The output of the LSI is a fixed off time, when the sensor is interrupting (filter is in proper position) it disables the power to the coil via the one shot timer ship and its output to the driver chips. If the page flip happens to change, nothing will happen until the constant off time expires. This MOSFET circuit can be implemented within element 342 of FIG. 3C. The page flip signal drives this mechanism at system resonant frequency with minimal use of power.

Figure 7:
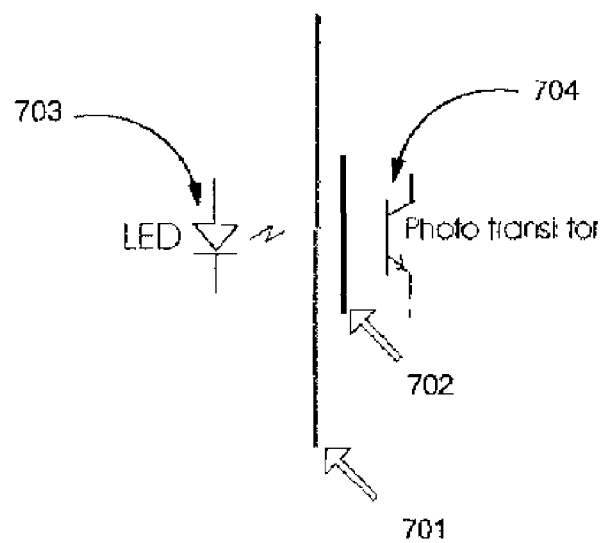
FIG. 7 illustrates the sensor configuration.

Referring to FIG. 7, a functional side view illustration shows an example phototransistor and photosensor set up for implementing each of the two sensor portions of the present embodiment. The left and right polarizer filter 701 travels between one of two pairs of an LED 703 and a photosensor 704. A fixed polarizer film 702 is located between the phototransistor and the LED of each sensor and has a polarization angle orthogonal to the polarization angle of either the corresponding left or the right polarization filter on the oscillating polarizer arm when the arm achieves its corresponding terminus point in its oscillating travel path. When the oscillating polarized filter passes between the LED and the photosensor, the LED light will be blocked due to the orthogonal cooperation between the oscillating polarizer filter and the fixed polarizer filter. This blockage of the LED 703 emitted light is detected by the photosensor 704 and generates a signal, as described above which can be arbitrarily designed as either a positive or negative going signal, indicating that the oscillating polarizer is in position.

Figure 8:
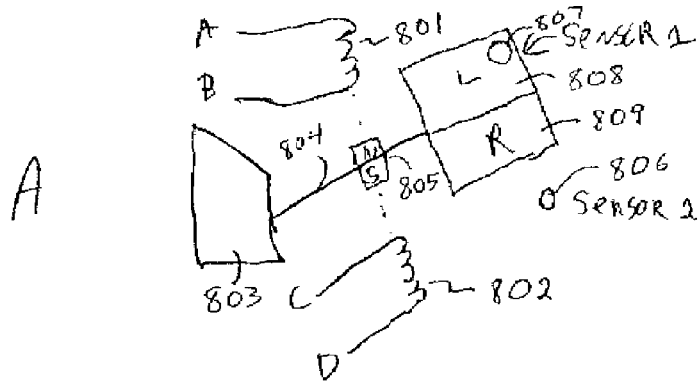
FIGS. 8A-C illustrate an embodiment of the present invention.
Figure 8:
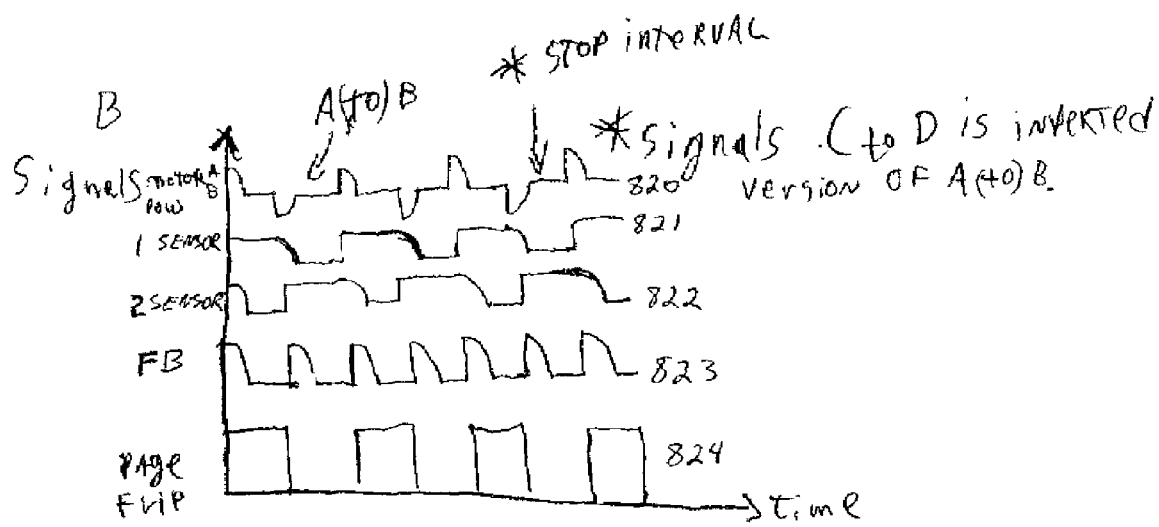
Figure 8:
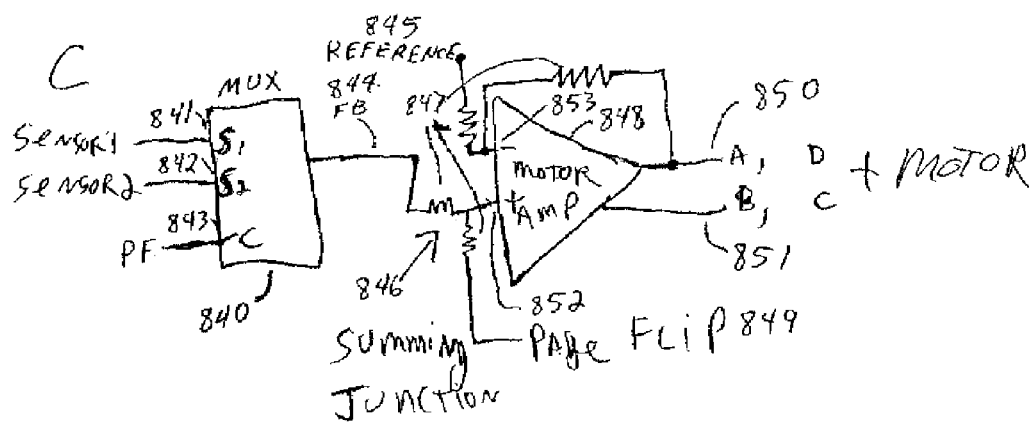

FIG. 8A illustrates an overall view of an embodiment of the present invention. Motor apparatus 803 drives rigid arm 804 in oscillation between sensor 1 807 and sensor 2 806. The rigid arm has attached polarizing filters 808 and 809, and a permanent magnet 805 for cushioning interaction with solenoids 801 and 802.

As shown in FIG. 8A, sensor 1 807, because it is blocked by the polarizing filter, is, for example, outputting a low voltage signal, approximately zero, and sensor 2 806 is outputting a high signal. It will be obvious to those skilled in the art that the signaling can be selectively designed to output a high, logical 1, signal when the sensor is blocked and a low signal when it is not blocked.

With reference to FIG. 8C, depending on the state of the PF signal, the sensor 1 or sensor 2 output will be multiplexed out, via multiplexer 840, and used as the feedback signal 844, waveform shown at 823, which is coupled to input 852 of the motor amplifier 848 together with the page flip signal 849 forming a summing junction at the input. This feedback signal 823 is shown in FIG. 8B.

With regard to the linear differential output motor amplifier 848, its output A+B, 850 is proportional to the difference in the input voltage at the + pin 852 and the fixed reference voltage 845 at the − pin 853. The output of the motor amp is coupled both to the air core solenoids 801 and 802 and to the voice coil actuator 803 (motor) in one embodiment of the present invention. In another embodiment, the PWM embodiment, the motor amp is coupled only to the voice coil actuator. These signals to the solenoids create a force against the polarizer arm permanent magnets 805 (driven by the angular voice coil actuator) to provide a damping effect for the arm.

Referring to FIG. 8C, the page flip signal is fed into the mux control 843 and the motor control amplifier 849. The page flip signal, illustrated at 824, operates to trigger multiplexing, via multiplexer 840, the appropriate upper or lower sensor output, provided to the multiplexer at inputs 841 and 842, depending on the state of the page flip signal (hi or low). The sensor outputs are illustrated at 821 and 822, with the multiplexer output shown at 823. The feedback signal 844 having a waveform 823 is comprised of a combination of the sensor outputs 821 and 822 muxed at appropriate intervals. FIG. 8B illustrates that the sensor outputs 821 and 822 are substantially identical and offset by approximately 180 degrees. The corresponding page flip signal 824 selects the interval of each output. The waveforms illustrated are not drawn to be precise, they can vary depending on the size of the polarized filter and the distance between sensors. The page flip signal 849, when summed with the FB signal 844 at the motor amp input 852, results in the motor drive signal 820 which is also coupled to solenoid 801 in the polarity A-B and to solenoid 802 in the inverted polarity D-C, as shown at motor amp output 850 in FIG. 8C. The differential amplifier 848 takes as its input the summing junction 846 voltage and reference voltage 845. Resistors 847 are provided at the motor amp inputs for the page flip signal, reference, feedback signal, and motor amp output feedback.

Figure 9:
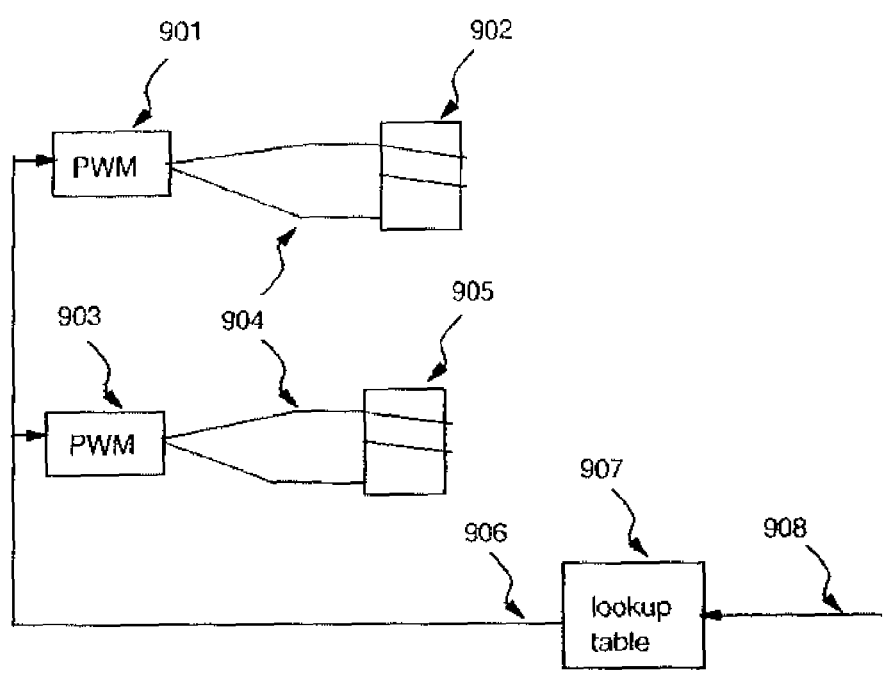
FIG. 9 illustrates an embodiment of the present invention.

Pulse Width Modulation ("PWM") Embodiment:

The connection from the motor drive amp to the solenoids, in the closed loop embodiment, can be replaced by the PWM modulation embodiment as described below, with reference to FIG. 9. The PWMs 901 and 903 are dedicated to driving the solenoids 902 and 905 only while the motor amp drives only the voice coil actuator. The page flip signal 908 is coupled to the multiplexer and to the motor drive amp and is also fed to the PWM lookup table 907, which lookup table responds to the page flip frequency. Based on the input frequency, the lookup table selects a pulse width, or duty cycle, which is represented as a voltage level control signal 906 transmitted to the PWMs 901 and 903. In this sense, a PWM is a programmable device having a voltage level control input. Its output is typically a square wave having a particular pulse width. A typical analog PWM outputs a fixed frequency signal and increases its duty cycle based on a level of input voltage, typically a DC input voltage, in this embodiment provided by lookup table 907. The output voltage level 906 of the lookup table 907, in turn, is controlled by a frequency of the input page flip signal 908. The fixed output frequency of the PWMs 901 and 903 can be arbitrarily selected, for example, in the KHz range so that average the magnetic flux provided by solenoids 902 and 905 can be modulated via control of the PWM duty cycle. The PWM output frequency should be much higher than the oscillation frequency of the polarizer arm. An air core solenoid embodiment provides scalable magnetic cushioning for the polarizer arm.

The duty cycle of the PWM is determined by the page flip 908 rate input to the lookup table 907. For example, a 60 Hz detected input might correspond to a 10% duty cycle output by the PWMs as controlled by a corresponding output voltage level provided to the PWMs by the lookup table. The voltage level received by the PWMs is also recognized as corresponding to a 10% duty cycle. As a further example, 85 Hz could correspond to a 22% duty cycle and a 120 Hz rate could correspond to a 50% duty cycle. These are selectable for best performance of any particular system. Typically, a higher page flip frequency will result in a higher duty cycle output by the PWM. This will, in turn, result in higher magnetic field strength provided by the solenoids that will be required in order to better cushion the polarizer arm which is being driven at higher speeds due to the higher frequency of the page flip signals. The outputs to the solenoids by each PWM will have an identical duty cycle and phase relationship. The magnetic flux at the top and bottom of the solenoids correspond to the north and south pole fields of a permanent magnet. The output of the lookup table can be selectively based on a natural measured resonant frequency of the system and is stored in a memory of the lookup table. Changes in system design (weight of filters, length of filter arm, strength of voice actuator coil, etc) will affect its resonant frequency and the corresponding lookup table values can be adjusted accordingly.

ADVANTAGES OF THE INVENTION

Our invention can operate on projection systems with one, two, or three digital mirror devices ("DMD"), wherein more devices are used to improve color contrast and resolution. Our invention allows for a magnetomechanically oscillating polarizer to be placed outside the projector. In this way, any existing projector can be modified to provide a 3D effect.

Our invention includes an embodiment that is capable of substantial extinction between the two polarization states. Since our invention does not require modification to the projector filter wheel (which is a precision balanced component spinning at thousands of RPMs and higher), it becomes significantly easier to implement at lower cost.

Alternative Embodiments

It will be appreciated that, although specific embodiments of the invention have been described herein for purposes of illustration, various modifications may be made without departing from the spirit and scope of the invention. The entire assembly, as illustrated in FIG. 3C, for example, may be enclosed in an airtight vacuum transparent glass container.

An incoming 2D signal can be switched directly to the DLP system and bypass the 3D imaging circuits by implementing a simple switch at 301. Optionally, the 3D imaging path can be outfitted with detection circuits that automatically detect incoming multiple image streams and automatically send those signals to the 3D generating technology of the present invention. Such an automatic activation option could also be manually disabled. These alternative embodiments are considered to be simple adjustments to the present invention and do not fall outside the scope of the present claims. Accordingly, the scope of protection of this invention is limited only by the following claims and their equivalents.

We claim:

1. A method comprising the steps of:
 receiving image data comprising a plurality of image streams, each of the image streams comprising a plurality of frames;
 projecting the image data toward a viewable screen, wherein the projecting step comprises alternating between the image streams; and
 disposing a magnetomechanically oscillating filter comprising first and second type filters between a projector of the image data and the viewable screen for filtering frames projected from a first one of the image streams through the first type filter and filtering frames projected from a second one of the image streams through the second type filter;
 wherein said magnetomechanically oscillating filter comprises an oscillating arm and at least two parallel permanent magnetic plates, the parallel permanent magnetic plates comprising a magnetic flux strength resonant at a desired operating frequency for the image streams; and
 wherein the oscillating arm is magnetically cushioned as it approaches an endpoint of an oscillation path.

2. The method of claim 1, further comprising the steps of:
 filtering from one eye of a viewer the frames from the first one of the image streams through another second type filter; and
 filtering from the other eye of the viewer the frames from the second one of the image streams through another first type filter.

3. The method of claim 2, wherein all the filtering steps in combination comprises alternately blocking the projected image data from only one eye of the viewer.

4. The method of claim 2, wherein the steps of filtering frames from the first one of the image streams and filtering frames from the second one of the image streams comprise activating a filter mechanism synchronized with page flip signals that alternately situates the first type filter and the second type filter in the path of the projected image data.

5. The method of claim 1, wherein the image data contains page flip signals corresponding to one of the image streams and the step of filtering frames from a first one of the image streams comprises detecting the page flip signals in the image data that correspond to the first one of the image streams.

6. The method of claim 1, wherein the receiving step comprises receiving a series of frames each alternately from each of the plurality of image streams.

7. The method of claim 1, wherein the step of filtering frames from the first one of the image streams comprises polarizing the frames at a first polarization angle, and the step of filtering frames from the second one of the image streams comprises polarizing the frames at a second polarization angle.

8. The method of claim 7, wherein the first type filter comprises a polarized filter at the first polarization angle, and the second type filter comprises a polarized filter at the second polarization angle.

9. The method of claim 1, further comprising:
detecting a position of the first type filter; and
responsive to the detecting, controlling an oscillation of the magnetomechanical oscillating filter.

10. A television system comprising:
an input for receiving image data comprising a plurality of image streams, each of the image streams comprising a plurality of frames;
a light projector for projecting the image data toward a viewable screen, wherein the projecting step comprises alternating between the image streams; and
a magnetomechanical oscillating filter for polarizing the projected image streams each at a different polarizing angle, the magnetomechancial oscillating filter comprising first and second type filters disposed between the project and the viewable screen for filtering frames projected from a first one of the image streams through the first type filter and filtering frames projected from a second one of the image streams through the second type filter;
wherein said magnetomechanically oscillating filter further comprises an oscillating arm and at least two parallel permanent magnetic plates, the parallel permanent magnetic plates comprising a magnetic flux strength resonant at a desired operating frequency for the image streams; and
wherein the oscillating arm is magnetically cushioned as it approaches an endpoint of an oscillation path.

11. The television system of claim 10 wherein the magnetomechanical oscillating filter further comprises first and second type filters disposed between the projector and the viewable screen for filtering frames projected from a first one of the image streams through the first type filter and filtering frames projected from a second one of the image streams through the second type filter.

12. The television system of claim 11, wherein the first type filter is a polarization filter polarized at a first polarization angle and the second type filter is a polarization filter polarized at a second polarization angle.

13. The television system of claim 12, wherein the second polarization angle is orthogonal to the first polarization angle.

14. The television system of claim 10, further comprising:
passive eyewear having first and second type filter lenses for filtering from one eye of a viewer the frames from the first one of the image streams through the second type filter lens and for filtering from the other eye of the viewer the frames from the second one of the image streams through the first type filter lens.

15. The television system of claim 14, further comprising a field converter coupled to the input for detecting page flip signals in the image data and for outputting at least the page flip signals separate from the image data.

16. The television system of claim 10, further comprising:
page flip signals contained in the image data corresponding to one of the image streams and a circuit for detecting the page flip signals for controlling the magnetomechanical oscillating filter to align the first type filter with the projector when the page flip signal indicates that image data corresponds to the first one of the image streams.

* * * * *